United States Patent
DiGirolamo et al.

(10) Patent No.: US 10,735,888 B2
(45) Date of Patent: *Aug. 4, 2020

(54) MACHINE-TO-MACHINE (M2M) GATEWAY (GW) AND METHOD FOR M2M REGISTRATION

(71) Applicant: IOT HOLDINGS, INC., Wilmington, DE (US)

(72) Inventors: Rocco DiGirolamo, Laval (CA); Inhyok Cha, Seoul (KR); Paul L. Russell, Jr., Pennington, NJ (US); Nicholas J. Podias, Brooklyn, NY (US); Jean-Louis Gauvreau, La Prairie (CA); Dale N. Seed, Allentown, PA (US); Ana Lucia Pinheiro, Beaverton, OR (US); Michael F. Starsinic, Newtown, PA (US); Chonggang Wang, Princeton, NJ (US)

(73) Assignee: IOT Holdings, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,361

(22) Filed: Oct. 15, 2018

(65) Prior Publication Data

US 2019/0052993 A1  Feb. 14, 2019

Related U.S. Application Data

(63) Continuation of application No. 13/037,916, filed on Mar. 1, 2011, now Pat. No. 10,104,492.
(Continued)

(51) Int. Cl.
*H04W 4/00* (2018.01)
*H04L 29/08* (2006.01)
(Continued)

(52) U.S. Cl.
CPC .............. *H04W 4/00* (2013.01); *H04L 67/12* (2013.01); *H04W 4/50* (2018.02); *H04W 4/70* (2018.02)

(58) Field of Classification Search
CPC .......... H04W 4/00; H04W 4/70; H04W 4/50; H04L 67/12
See application file for complete search history.

(56) References Cited

U.S. PATENT DOCUMENTS 7,437,509 B2  10/2008 Vayssiere
7,570,587 B1  8/2009 Wilson et al.
(Continued)

FOREIGN PATENT DOCUMENTS

EP  1 364 516  11/2003
EP  2 129 095  12/2009
(Continued)

OTHER PUBLICATIONS

European Telecommunications Standards Institute, Draft ETSI TS 102 690 V0.1.2, "Machine-to-Machine Communications (M2M), Functional Architecture", Jan. 2010, pp. 1-34.
(Continued)

*Primary Examiner* — Daniel C. Murray
(74) *Attorney, Agent, or Firm* — Volpe and Koenig, P.C.

(57) ABSTRACT

A machine-to-machine (M2M) gateway (GW) includes reachability, addressing, and repository (RAR) capability. The GW maintains a local mapping table and local device application repository, performs data aggregation, address/name translation, provides event reporting and establishes GW reachability and wake-up time. The GW supports requests from M2M applications or other capabilities within the GW, and from a network and application (N&A) domain RAR. The GW may include an M2M device and M2M gateway management (MDGM) capability that receives
(Continued)

management requests for an M2M device and functions as a network proxy. The MDGM accepts and processes requests from the N&A domain on behalf of the M2M device and performs management functions of the M2M device on behalf of the N&A domain. The MDGM may request the N&A domain for permission to interact with the M2M device, initiate an interaction for device management tasks with the M2M device, and report to the N&A domain.

15 Claims, 12 Drawing Sheets

Related U.S. Application Data

(60) Provisional application No. 61/309,297, filed on Mar. 1, 2010, provisional application No. 61/311,161, filed on Mar. 5, 2010, provisional application No. 61/326,081, filed on Apr. 20, 2010.

(51) Int. Cl.
  *H04W 4/70* (2018.01)
  *H04W 4/50* (2018.01)

(56) References Cited

U.S. PATENT DOCUMENTS

| | | | |
|---|---|---|---|
| 7,720,098 B1 | 5/2010 | Allen et al. | |
| 7,747,724 B2 | 6/2010 | Wallis et al. | |
| 7,774,008 B2 | 8/2010 | Benaouda et al. | |
| 7,996,465 B2 | 8/2011 | Cromp et al. | |
| 8,014,368 B2 | 9/2011 | Kim et al. | |
| 8,117,297 B2 | 2/2012 | Wallis et al. | |
| 8,359,271 B2 | 1/2013 | Peckover | |
| 8,553,602 B2 | 10/2013 | Hargrave et al. | |
| 8,681,754 B2 | 3/2014 | Ishii | |
| 8,737,989 B2 | 5/2014 | Luft | |
| 8,750,145 B2* | 6/2014 | Shaheen | H04L 63/104 370/252 |
| 8,797,856 B1 | 8/2014 | Ballal et al. | |
| 8,838,806 B2 | 9/2014 | Lu et al. | |
| 8,965,415 B2 | 2/2015 | Song et al. | |
| 9,031,014 B2 | 5/2015 | Chen | |
| 9,037,730 B2 | 5/2015 | Sanchez Herrero | |
| 9,270,552 B2 | 2/2016 | Jubinville et al. | |
| 9,426,029 B2 | 8/2016 | Saavedra | |
| 9,491,673 B2 | 11/2016 | Jain et al. | |
| 9,800,621 B2 | 10/2017 | Starsinic et al. | |
| 2003/0018769 A1 | 1/2003 | Foulger et al. | |
| 2003/0140112 A1 | 7/2003 | Ramachandran et al. | |
| 2006/0069715 A1 | 3/2006 | Vayssiere | |
| 2006/0171403 A1 | 8/2006 | Kim et al. | |
| 2006/0211404 A1 | 9/2006 | Cromp et al. | |
| 2006/0232287 A1 | 10/2006 | Sterner et al. | |
| 2006/0253556 A1 | 11/2006 | Wallis et al. | |
| 2006/0262801 A1 | 11/2006 | Sargent et al. | |
| 2007/0169107 A1 | 7/2007 | Huttunen | |
| 2008/0008106 A1 | 1/2008 | Boberg et al. | |
| 2008/0153521 A1 | 6/2008 | Benaouda et al. | |
| 2008/0270548 A1 | 10/2008 | Glickstein et al. | |
| 2009/0070447 A1 | 3/2009 | Jubinville et al. | |
| 2009/0080394 A1 | 3/2009 | Ishii | |
| 2009/0092108 A1 | 4/2009 | Hargrave et al. | |
| 2009/0150789 A1 | 6/2009 | Regnier | |
| 2009/0210574 A1 | 8/2009 | Fleming et al. | |
| 2009/0217348 A1* | 8/2009 | Salmela | H04W 4/70 726/2 |
| 2010/0057485 A1 | 3/2010 | Luft | |
| 2010/0195611 A1 | 8/2010 | Allen et al. | |
| 2010/0257261 A1 | 10/2010 | Wallis et al. | |
| 2011/0047219 A1 | 2/2011 | Tripathi et al. | |
| 2011/0211464 A1 | 9/2011 | Chetlur et al. | |
| 2011/0213871 A1 | 9/2011 | DiGirolamo et al. | |
| 2011/0238844 A1 | 9/2011 | Lu et al. | |
| 2011/0268047 A1 | 11/2011 | Nath et al. | |
| 2011/0274040 A1 | 11/2011 | Pani et al. | |
| 2011/0314470 A1 | 12/2011 | Elyashev et al. | |
| 2012/0047551 A1 | 2/2012 | Pattar et al. | |
| 2012/0047558 A1 | 2/2012 | Sundaram et al. | |
| 2012/0063305 A1 | 3/2012 | Chiu et al. | |
| 2012/0066396 A1 | 3/2012 | Kang et al. | |
| 2012/0163169 A1 | 6/2012 | Yang et al. | |
| 2012/0218965 A1 | 8/2012 | Chen | |
| 2013/0003609 A1 | 1/2013 | Ballot et al. | |
| 2013/0013555 A1* | 1/2013 | Foti | H04W 4/70 707/609 |
| 2013/0013793 A1* | 1/2013 | Sanchez Herrero | H04W 4/70 709/227 |
| 2013/0016657 A1* | 1/2013 | Muhanna | H04W 4/70 370/328 |
| 2013/0017779 A1 | 1/2013 | Song et al. | |
| 2013/0041997 A1* | 2/2013 | Li | H04W 4/70 709/223 |
| 2013/0094444 A1* | 4/2013 | Lai | H04W 4/70 370/328 |
| 2013/0188515 A1 | 7/2013 | Pinheiro et al. | |
| 2013/0189955 A1 | 7/2013 | Horn et al. | |
| 2013/0262576 A1 | 10/2013 | Foti | |
| 2013/0329653 A1 | 12/2013 | Russell, Jr. et al. | |
| 2013/0336222 A1 | 12/2013 | Lu et al. | |
| 2014/0161037 A1 | 6/2014 | Gumbrell et al. | |
| 2014/0344451 A1 | 11/2014 | Luft | |
| 2015/0244580 A1 | 8/2015 | Saavedra | |
| 2016/0315808 A1 | 10/2016 | Saavedra | |

FOREIGN PATENT DOCUMENTS

| | | |
|---|---|---|
| JP | 2008-294821 | 12/2008 |
| JP | 2009-077119 | 4/2009 |
| JP | 2009-260451 | 11/2009 |
| JP | 5443625 | 3/2014 |
| TW | 2011-41124 | 11/2011 |
| TW | 2012-06113 | 2/2012 |
| TW | 2012-15181 | 4/2012 |
| TW | 569615 | 2/2017 |
| WO | 2008/027615 | 3/2008 |
| WO | 2008/088414 | 7/2008 |
| WO | 2009/002236 | 12/2008 |
| WO | 2009/103621 | 8/2009 |
| WO | 2009/122219 | 10/2009 |
| WO | 2010/002303 | 1/2010 |
| WO | 2011/082150 | 7/2011 |
| WO | 2011/087826 | 7/2011 |
| WO | 2011/109424 | 9/2011 |
| WO | 2012/018893 | 2/2012 |

OTHER PUBLICATIONS

European Telecommunications Standards Institute, "Machine-to-Machine Communications (M2M); Functional Architecture," ETSI TS 102 690 v0.1.3, Feb. 2010.
European Telecommunications Standards Institute, "Machine-to-Machine Communications (M2M); M2M Service Requirements," ETSI TS 102 689 v0.4.1, 2009.
European Telecommunications Standards Institute, "Machine-to-Machine Communications (M2M); Functional Architecture," ETSI TS 102 690 v1.1.1, (Oct. 2011).
Lu, "Overview of ETSI M2M Release 1 Stage 3—API and Resource Usage," ETSI TC M2M Workshop (Oct. 2011).
Pareglio, "Overview of ETSI M2M Architecture," ETSI TC M2M Workshop (Oct. 2011).
Pattar et al., "M2M Device and Gateway Connectivity", ETSI TC M2M#08 M2M(10)0018r3, InterDigital Communications, Sophia Antipolis, Jan. 18-22, 2010, 6 pages.
Third Generation Partnership Project (3GPP), S3-100082, "Contribution to Provide Some Key Issues For The Security Aspects of

(56) References Cited

OTHER PUBLICATIONS

MTC", Interdigital Communications Corporation, 3GPP TSG-SA3 (Security), SA3 Mtg#58, Xian, China, Feb. 1-5, 2010, 4 pages.

* cited by examiner

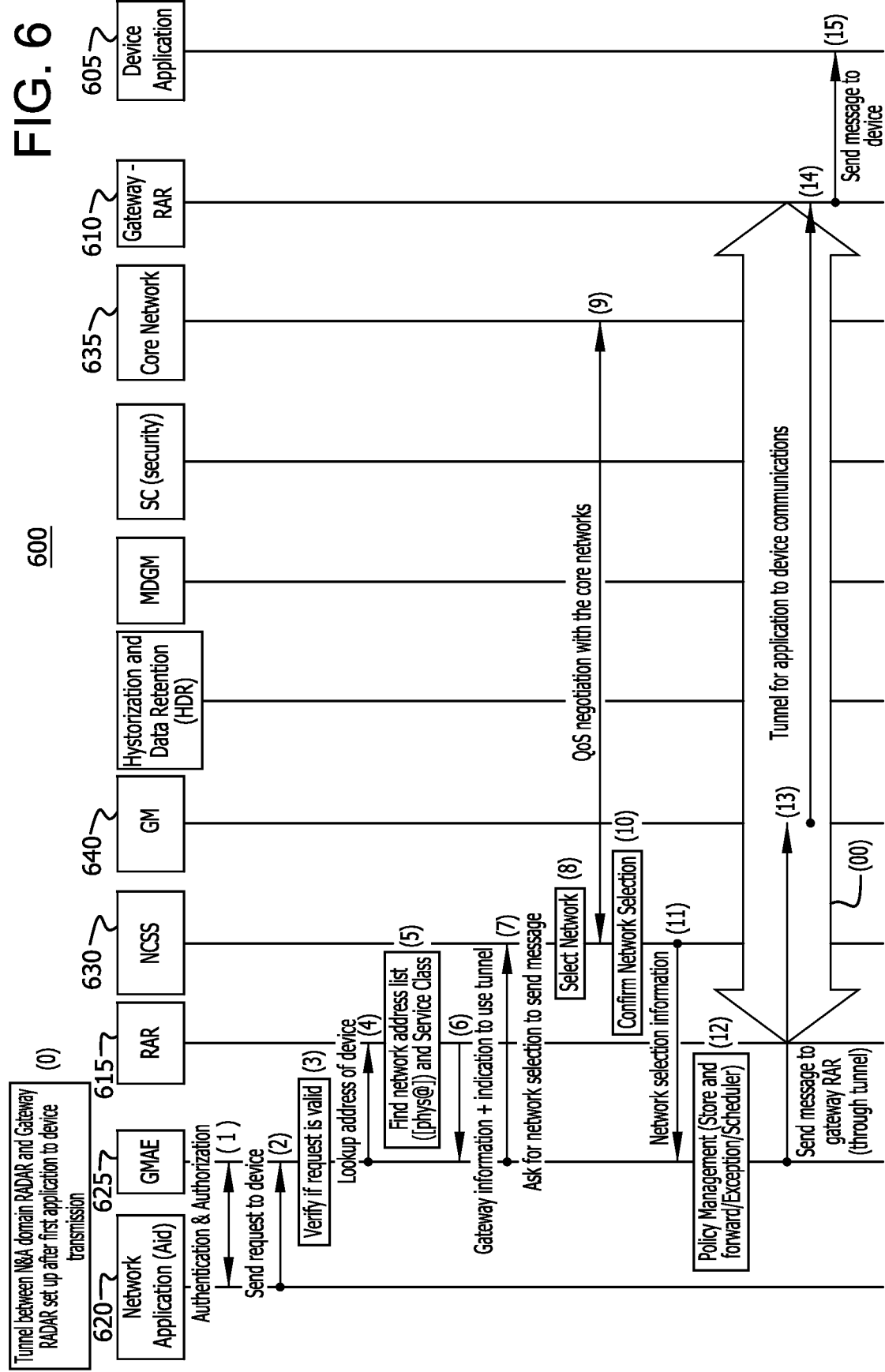

MACHINE-TO-MACHINE (M2M) GATEWAY (GW) AND METHOD FOR M2M REGISTRATION

CROSS REFERENCE TO RELATED APPLICATIONS

This application is a continuation of U.S. application Ser. No. 13/037,916 filed Mar. 1, 2011, which claims the benefit of U.S. Provisional Application No. 61/309,297 filed Mar. 1, 2010; U.S. Provisional Application No. 61/311,161 filed Mar. 5, 2010; and U.S. Provisional Application No. 61/326,081 filed Apr. 20, 2010, all of which are hereby incorporated by reference herein.

FIELD OF THE INVENTION

This application is related to wireless communications.

BACKGROUND

Machine-to-machine (M2M) systems may include M2M devices that reside behind M2M gateways (GWs). These M2M devices may be remotely accessed through the GWs. Remote access may be imposed either as a result of a physical/hardware/software limitation, or by a choice of the M2M devices, (e.g., in cases where device power conservation may be desired). M2M GW functionality may include security capability (SC) functionality, generic messaging (GM) capability functionality, M2M device and M2M GW management (MDGM) capability functionality, and support for the GW as network proxy connectivity.

For M2M devices that reside behind an M2M GW, two connectivity options, known as case 1 and case 2, may be applicable as summarized below. In the case 1 connectivity, also known as direct connectivity, the M2M devices may connect to a network and application (N&A) domain directly via the access network or through an M2M GW. The M2M device may perform procedures, such as registration, authentication, authorization, management and provisioning with the N&A domain, for example. The M2M device may have other devices connected to it that may be hidden from the N&A domain.

In the case 2 connectivity, also known as M2M GW as network proxy connectivity, the M2M device may connect to the N&A domain via an M2M GW. M2M devices may connect to the M2M GW via an M2M area network, for example. The M2M GW may connect to the N&A domain via an access network and act as a proxy for the M2M N&A domain towards the M2M devices that may be connected to the M2M GW. Such an M2M GW may perform procedures, such as authentication, authorization, registration, management, and provisioning of the M2M devices that may be connected to it, and may also execute applications on behalf of the M2M N&A domain. The M2M GW may decide on routing service layer requests originating from applications on M2M devices locally or to the M2M N&A domain. The M2M devices that connect to such an M2M GW may or may not be addressable by the M2M N&A domain.

The M2M GW functionality may have a number of shortcomings that may lead to inefficiencies if reachability, addressing, and repository functionality resides solely in the N&A domain. For example, in the "case 2" connectivity case, the device registration functionality may be moved to the M2M GW. It may be inefficient for the device to register with the M2M GW, yet have the registration information stored in the N&A domain. Other shortcomings may include access to M2M area addresses, signaling overhead associated with updating device mapping tables, device status synchronization, and device mobility.

SUMMARY

A machine-to-machine (M2M) architecture and functionality is described that provides reachability, addressing, and repository (RAR) capability in an M2M gateway (GW). The M2M GW may maintain a local mapping table, perform data aggregation, address translation, name translation, maintain a local device application repository, and establish M2M GW reachability and wake-up time based on an underlying M2M device reachability and wake-up time. The M2M GW may communicate with a neighbor M2M GW RAR to facilitate the sharing and synchronization of proxy RAR based information between M2M GWs, base a registration on a registration attribute and request that cached data be used if a device is unreachable. The M2M GW RAR may support requests from other capabilities within the M2M GW or from M2M applications within the M2M GW. The M2M GW RAR may support requests from a network and application (N&A) domain RAR and the N&A RAR may be notified when certain events occur.

The M2M GW may include an M2M device and M2M gateway management (MDGM) capability that receives management requests for an M2M device. The MDGM in the M2M GW may function as a network proxy. The MDGM may accept and process the management request from the N&A domain on behalf of the M2M device. The MDGM may perform management functions of the M2M device on behalf of the N&A domain. The MDGM may request the N&A domain for permission to start interacting with the M2M device to perform device management tasks. The MDGM may initiate, as per the policy of the network and application domain provisioned to the M2M gateway, an interaction for device management tasks with the M2M device, and inform the N&A domain the results of the interaction for the device management tasks.

BRIEF DESCRIPTION OF THE DRAWINGS

A more detailed understanding may be had from the following description, given by way of example in conjunction with the accompanying drawings wherein:

FIG. 6 is an example call flow of a network to device communication with a GW RAR and tunnel;

DETAILED DESCRIPTION

Figure 1A:
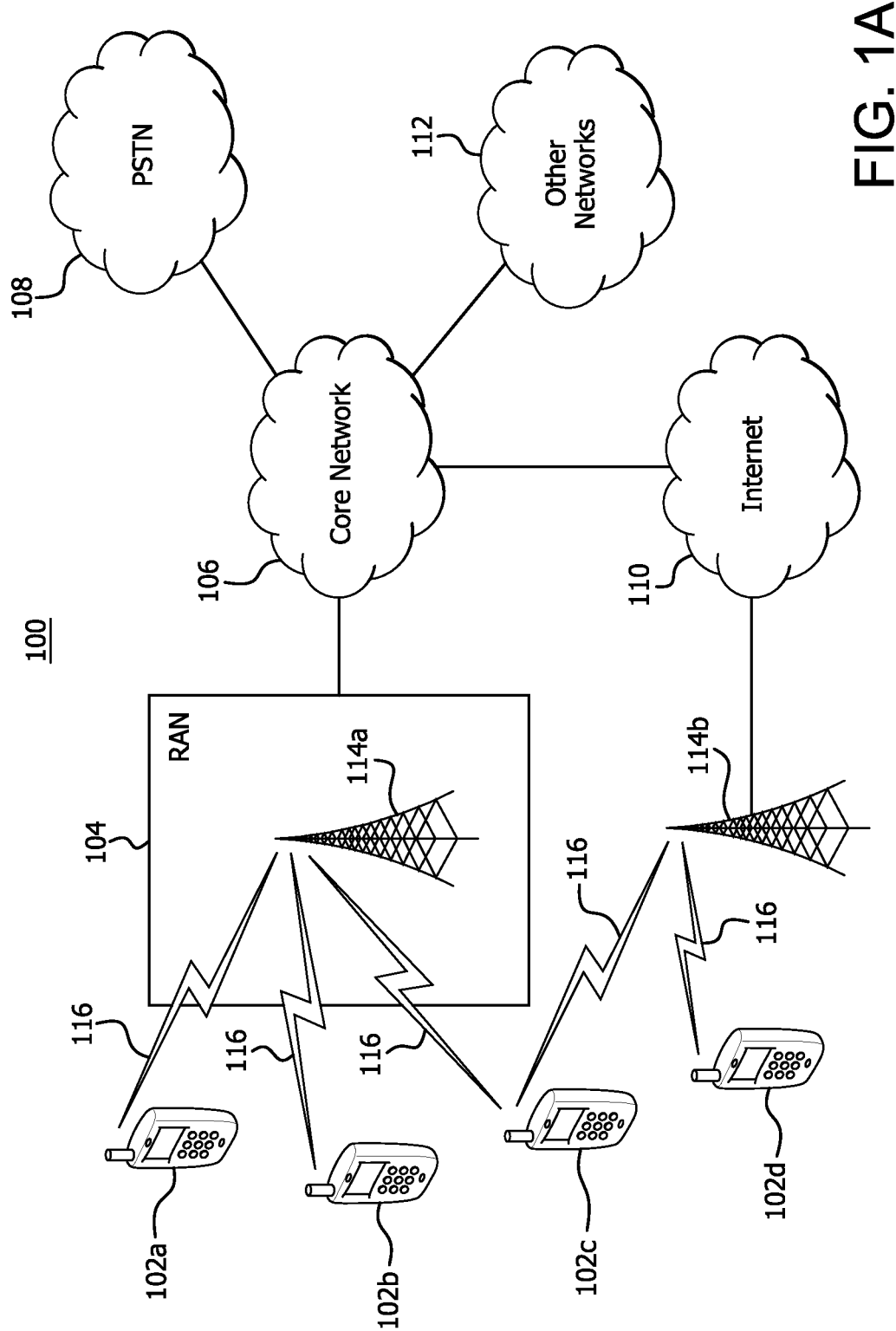
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. A machine-to-machine (M2M) device may be a WTRU.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
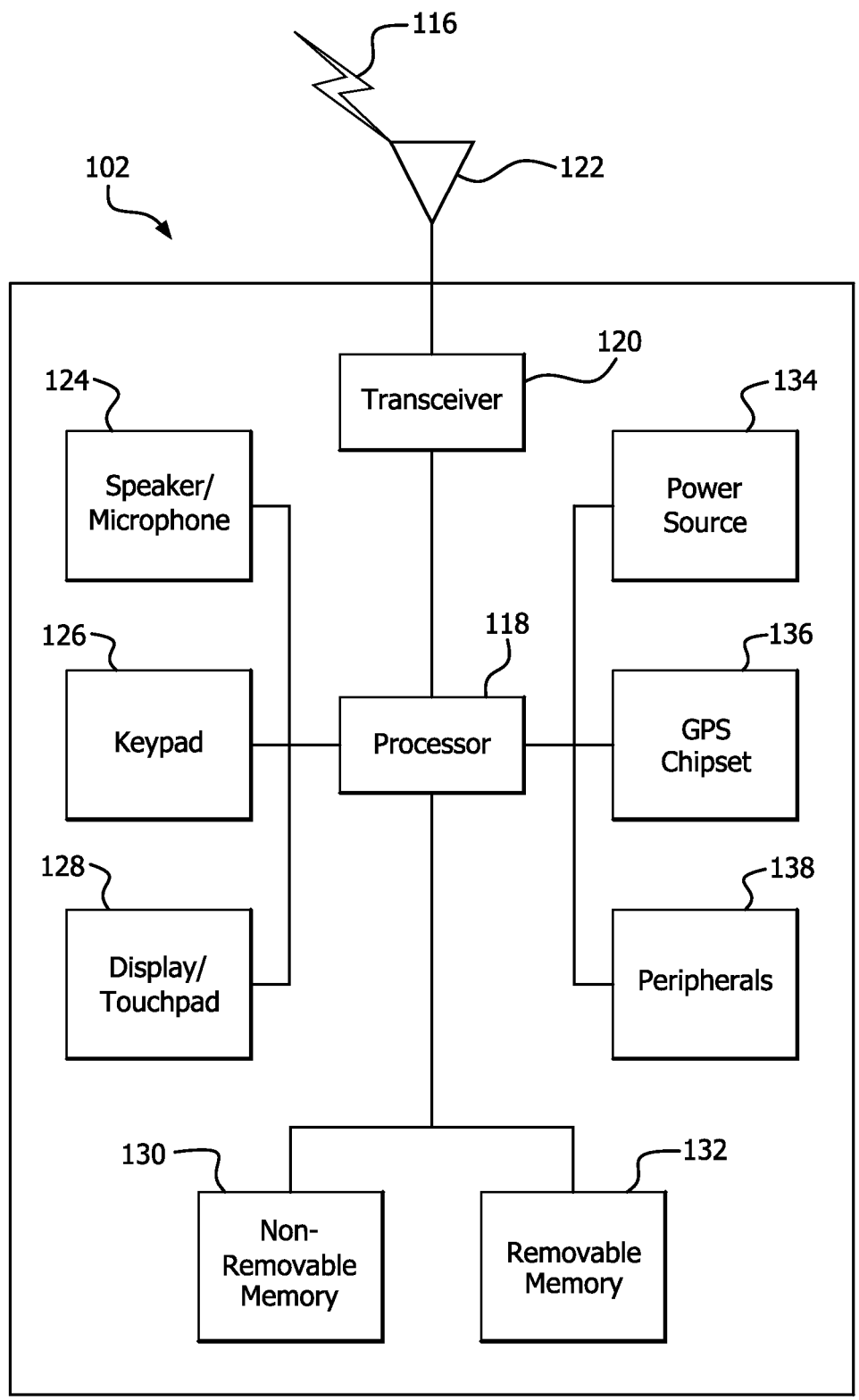
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
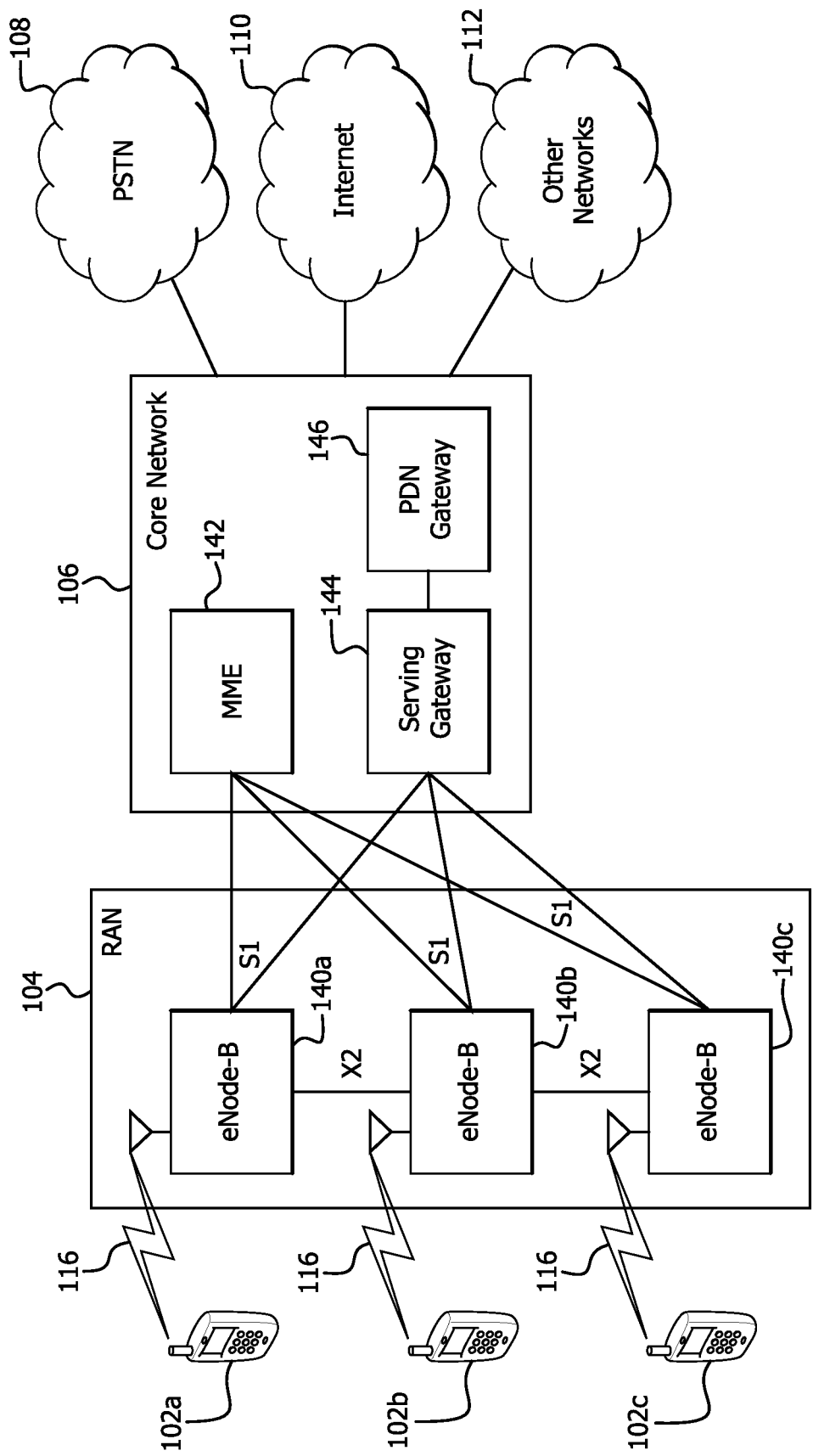
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Device user-plane data may be data that is generated by M2M devices, for example sensor data. Registration attributes may include characteristics of devices that may be allowed to register. The characteristics may relate to physical characteristics such as, for example, available power, available capacity, device identification (ID), and/or service class. Device control-plane information may include control information that pertains to a specific device, for example information regarding reachability, wake-up times and durations, registration information, and/or service information.

End-to-end system requirements may be implemented to support M2M communication services. An M2M functional architecture may be designed to deliver M2M services to applications. The M2M functional architecture may present the overall end to end M2M functional entities, the relationships between these entities, as well as the relationship to European Telecommunications Standards Institute (ETSI) telecommunications and Internet converged services and protocols for advanced networks (TISPAN) and 3rd Generation Partnership Project (3GPP) networks.

Figure 2:
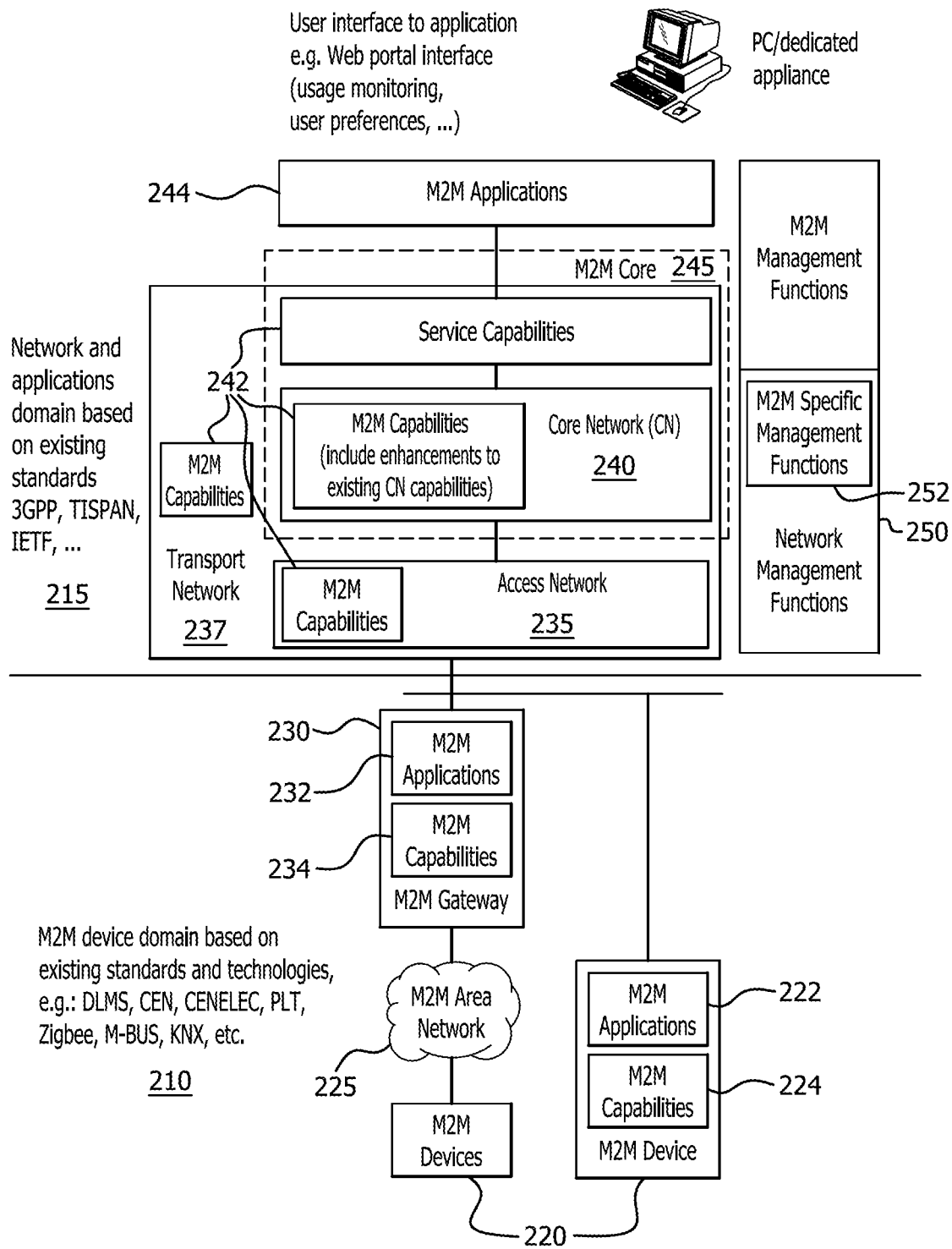
FIG. 2 is a high level overview of an example machine-to-machine (M2M) system.

FIG. 2 shows an example overall architecture 200. The architecture may be divided into two "domains": an M2M device domain 210 and a network and application (N&A) domain 215. The M2M device domain 210 may include M2M devices 220 that run M2M applications 222 using M2M service capabilities or M2M capabilities 224 (collectively "M2M service capabilities"), and N&A domain 215 functionality. The term "M2M applications" may refer to applications that run the service logic using the M2M service capabilities. The term "M2M service capabilities" may be a grouping of functions that may enable end-to-end communications between applications in M2M devices, M2M gateways and the M2M Core Network. The M2M device domain 210 may further include an M2M area network 225 that may communicate between the M2M devices 220 and an M2M gateway (GW) 230, where the M2M GW may include M2M applications 232 and M2M service capabilities 234. The M2M GW 230 may be used to communicate with the N&A domain 210.

The term "M2M GW" as used herein may refer to any entity that provides some service capabilities to devices behind it. These devices may be both ETSI and non-ETSI compliant, (e.g., legacy devices not supporting the M2M capabilities). Based on this definition, the M2M GW may be considered to be: 1) an ETSI compliant GW with ETSI compliant devices behind it, all connected through an M2M area network; 2) an ETSI compliant GW with non-ETSI compliant devices behind it, all connected through an M2M area network; 3) an ETSI compliant GW with a mixed device deployment behind it, (ETSI and non-ETSI compliant), all connected through an M2M area network; 4) an ETSI M2M device, connected to non-ETSI compliant devices using some legacy protocol, (e.g., Bluetooth®); 5) an ETSI M2M device, connected to ETSI compliant M2M devices; or 6) an ETSI compliant device with a mixed device deployment behind it, (ETSI and non-ETSI compliant devices).

The N&A domain 210 may include a transport network 237 for transporting data within the N&A domain 210, and an access network 235 for communicating with the M2M device domain 210. The access network 235 may communicate with a core network (CN) 240, which in turn may communicate with M2M service capabilities 242. The M2M service capabilities 242 and the CN 240 may comprise an M2M core 245. M2M applications 244 operate with M2M service capabilities 242. A network management function 250 may include functionality to manage the access network 235, transport network 237, and CN 240 and may include an M2M specific management function 252. AN M2M management function 255 may include functionality to manage M2M service capabilities and M2M applications.

Using the architecture 200 above, the M2M devices 220 in the M2M device domain 215 may either communicate directly with the N&A domain 210 using an access network 235, or alternatively, they may communicate indirectly through the M2M GW 230. For example, the M2M GW 230 may use the M2M area network 225 to communicate with the M2M devices 220 and may use the access network 235 to communicate with the N&A domain 210.

The N&A M2M service capabilities may include a reachability, addressing, and repository (RAR) functionality. However, the M2M GW lacks such functionality and may have a number of shortcomings that may lead to inefficiencies if the RAR functionality resides solely in the N&A domain. For example, in the case where the M2M devices connect to the N&A domain via an M2M GW, the device registration functionality may be moved to the M2M GW. Therefore, it may be inefficient for the M2M device to register with the M2M GW, yet have the registration information stored in the N&A domain. Moreover, the name resolution task for the M2M GW may be assigned to a generic message delivery (GM) capability. This approach, however, may not be in line with the approach used for the N&A domain.

In another example, device-to-device communications may be supported through the M2M GW. If an M2M device does not know the M2M area address of a neighboring device, it may need to query the N&A RAR functionality to determine where to route the messages. The message may then use the services of the GM capability in the service provider domain, to route the traffic to the destination. Eliminating this transfer out of the M2M area network 225 may be more efficient. This query functionality may be supported by the GW and therefore be done locally at the GW.

In another example, the N&A RAR may keep the device mapping table up to date. For cases where many M2M devices are behind an M2M GW, an M2M device may inform the N&A RAR about any change in address, reachability or sleep cycle, which may result in a potentially high signaling load. This may put a strain on the access and core networks. Moreover, the M2M GW's reachability and wake-up status may be out-of-sync with, or independent of, the underlying devices. This may result in the M2M GW potentially having to store and forward traffic that may be destined for sleeping M2M devices. Therefore information about reachability, sleep cycle and addressing may be kept locally in the GW and shared with the N&A domain only on a need basis.

In another example, M2M device mobility from one M2M GW to another may require a re-registration with the N&A domain service capabilities. Communication to M2M devices through multiple M2M GWs may not be permitted, for example for mission critical applications or load sharing. "Local" access, through a home Node-B, for example, may require that communication go to the N&A domain, even if an application server resides in the M2M GW. If the GW includes the RAR functionality, communication using local access may be facilitated.

Figure 3:
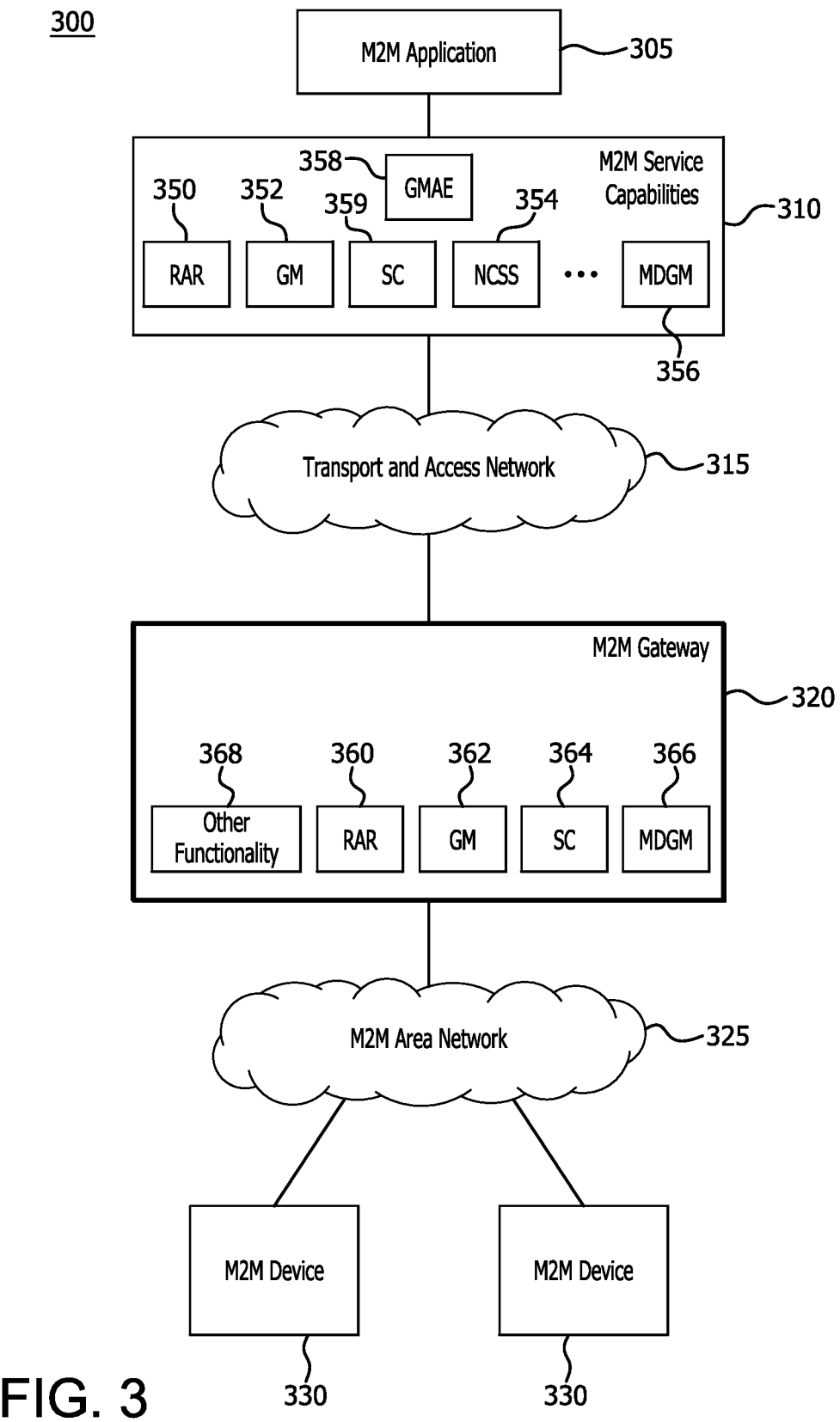
FIG. 3 is a block diagram of an example reachability, addressing and repository (RAR) entity in an M2M gateway (GW)

FIG. 3 shows a system architecture 300 where an M2M GW 320 may include a RAR entity 360. The system architecture 300 may include an N&A M2M application entity 305 which may be in communication with an N&A M2M service capabilities entity 310, which in turn may be in communication with a transport and access network entity 315. The transport and access network entity 315 may be in communication with the M2M GW 320. The M2M GW 320 may in turn be in communication with M2M devices 330 through M2M area network 325. The N&A M2M application entity 305 and the N&A M2M service capabilities entity 310 may be implemented using servers or alternatively, may be implemented in the network.

The N&A domain M2M service capabilities entity 310 may include for example reachability, addressing and device application repository (RAR) entity 350 provides capabilities as discussed herein, generic message delivery (GM) entity 352 provides at least session establishment and teardown along with security keys negotiation along with other capabilities, network and communication service selection (NCSS) entity 354 provides at least network selection when the M2M device or M2M GW can be reached through several network via several subscriptions along with other capabilities, M2M device and M2M GW management (MDGM) entity 356 provides capabilities as discussed herein, historization and data retention (HDR) entity (not shown) provides at least hiding of the history and data retention tasks from the M2M Application and the Devices/M2M GW along with other capabilities, generic M2M application enablement (GMAE) entity 358 is the single contact point to the M2M Applications in the N&A domain as well as providing other capabilities, security capability (SC) entity 359 provides at least authentication and service key management along with other capabilities, transaction management (TM) entity (not shown) handles at least the management of transactions along with other capabilities, and/or M2M device and M2M GW proxy (MDGP) entity (not shown) provides at least interworking between MDGM and the device or GW management functions.

The N&A domain RAR service capability may be tasked with functionality, such as name translation, reachability determination, wake-up determination, maintaining device information, maintaining a device application repository, and/or responding to requests. Converting a device name to a list of network routable addresses may be an example of name translation. For devices behind a GW, the network address may be that of the M2M GW. An example of reachability determination may be where, upon request, the RAR may provide the reachability status of a device. An example of wake-up determination may be where, upon request, the RAR may provide an indication of a device wake-up period. Other example functionalities may be to maintain a device information mapping table such as device X→address, reachability, and wake-up times, maintain a device application repository such as registration information of device and its applications, and/or respond to requests from applications and other service capabilities for device registration information.

The M2M GW 360 may include a RAR entity 360, a GM entity 362, a SC entity 364, a MDGM entity 366 and other functionality entity 368. The M2M GW RAR entity 360 may be a proxy RAR entity. The M2M GW RAR entity 360 may maintain a local mapping table and store the following M2M device information for the M2M devices residing behind it. For example, the M2M GW RAR entity 360 may store an M2M area network address for each M2M device. AN M2M device may acquire a new address as a result of mobility, topology changes within the M2M area network, its connection point within the M2M area network and the like. The M2M GW RAR entity 360 may also store a reachability status. The reachability status may be set to "on" when the M2M device is reachable, and to "off" when the M2M device is not reachable. The M2M GW RAR entity 360 may also store the next planned wake-up time and wake-up duration, if available. The above information may be sent from the M2M device to the M2M GW RAR entity 360 using a dedicated control message in the M2M area network, for example. The above functionalities may be included in any combination in the M2M GW RAR entity 360.

The M2M GW RAR entity 360 may also support requests from other capabilities within the M2M GW 320 or from the M2M application within the M2M GW 320. In some examples, the other capabilities or M2M applications may be notified upon the occurrence of certain events. For example, the generic M2M device application enablement (GMDAE) capability may need knowledge of the accessibility of a specific M2M device after it receives a message from the N&A domain. As a result, when the M2M device may become reachable and/or has its next planned wake-up time or wake-up duration may be sent to the GMDAE.

In another example, the M2M GW RAR entity 360 may support requests from the N&A domain RAR entity 350 and other M2M GW RARs. For example, the N&A domain RAR 350 and other M2M GW RARs may be notified for M2M devices behind the M2M GW 320 when certain monitored events occur. These events may, for example, be when a specific M2M device may become reachable, when an M2M device may acquire a new address as a result of mobility, and/or changes may occur on a set of M2M device applications registration information. These events may also include modification of specific data or attributes related to an application repository. For example, for a temperature sensor it could be the event of temperature modification or temperature reaching above or below a specified threshold. The above information may be provided after a change in status of any of the monitored events. Alternatively, the M2M GW 320 may decide to send this information periodically, for example every K time units, or based on a predefined policy. For example, if the M2M GW 320 manages address translation, it may determine not to report an M2M device address change. Similarly, if the M2M GW 320 provides store and forward capability, it may determine not to report wake-up time changes. This determination may also be based on the availability of the access network. For example, the access network may be congested, and may request that the M2M GW 320 refrain from sending this information.

In another example, the M2M GW RAR entity 360 may support requests from the N&A domain RAR entity 350 and other M2M GW RARs. For example, these requests may be for M2M devices behind the M2M GW 320 and may concern reachability of an M2M device and/or the next planned wake-up time of an M2M device.

In another example, the M2M GW RAR entity 360 may perform address translation between area network and core network, if applicable. Examples of address translations may include Internet Protocol version 4 (IPv4), IPv6, and mobile station international integrated service digital network (ISDN) number (MSISDN). Performing an address translation may involve translation between a public GW address and a private device address. The M2M GW RAR entity 360 may handle name resolution for messages sent from a GMDAE capability in the service provider towards an M2M device. The mapping may be between a network routable GW address and an M2M device specific ID to an M2M area network address.

In another example, the M2M GW RAR entity 360 may maintain a local device application repository for M2M devices behind the M2M GW. For example, this may be done by storing device service class properties for M2M devices within the area network and by keeping this information up to date. The M2M GW RAR entity 360 may aggregate/fuse this class information. In another example, it may be done by storing the M2M GW RAR entity 360 in the device application repository the M2M device application registration information of M2M devices and by keeping the information up to date. The M2M GW RAR entity 360 may aggregate/fuse this registration information. In another example, the M2M GW RAR entity 360 may maintain a local device application repository by providing a query interface to properly authenticate and authorize entities residing in the N&A domain for them to be able to retrieve M2M device applications registration information.

In another example, the M2M GW RAR entity 360 may maintain a local device application repository by providing, upon request, this information to any entity residing in the N&A domains, assuming the requesting entity is authenticated and authorized to perform such a query. Alternatively, the M2M GW RAR entity 360 may maintain a local device application repository by providing, upon request, this information to the M2M application residing in the M2M GW 320. The M2M GW 320 may use this information to assist in service discovery within the M2M area network 325. In one option, it may broadcast this information, for example using beacons. Alternatively, it may include this information in the responses sent to M2M devices, for example, after a registration request.

In another example, the M2M GW RAR entity 360 may establish M2M GW 320 reachability and wake-up time based on an underlying M2M device reachability and wake-up time. For example, if all M2M devices are unreachable, the M2M GW 320 may decide to turn off and inform the N&A RAR entity 350 of this action. Alternatively, the M2M GW 320 may synchronize its sleep time to the M2M devices under it. For example, if all M2M devices are asleep between 1:00 PM and 2:00 PM, the M2M GW 320 may decide to also sleep during this time. Alternatively, M2M GWs may base its decisions on a majority of the M2M devices.

In another example, the M2M GW RAR entity 360 may communicate with neighbor M2M GW RARs. This may allow inter-networking of multiple M2M GWs and their corresponding proxy RAR capabilities that may facilitate the sharing and synchronization of proxy RAR based information between M2M GWs. Such functionality may be used to support scenarios such as M2M device mobility, (e.g., optimized device handovers between separate M2M area networks serviced by separate M2M GWs), and enhanced reliability, performance and scalability via the use of multiple M2M GWs serving the same M2M area network(s). The inter-GW communication may be through a wired connection, (e.g., all M2M GWs sharing an Ethernet), through a parent GW/router device that may communicate with the multiple M2M GWs, (e.g., a home Node-B or Institute of Electrical and Electronics Engineers (IEEE) 802.11 wireless access point), or through the N&A domain.

In another example, the M2M GW RAR entity 360 may accept "registration attributes" from the N&A domain RAR 350 that may limit the types of devices allowed for local registration in the "case 2" connectivity scenario. For example, the N&A RAR entity 350 may notify the M2M GW RAR entity 360 to only allow registration for M2M devices with a specific service class, device ID, physical characteristic, (e.g., available power, available storage and/or the like). This in turn, may be used by the SC entity 364 to either accept or reject registrations. This functionality may also be implemented in the SC entity 364.

In another example, the M2M GW RAR entity 360 may request that cached data be used if an M2M device is unreachable. This may apply to the information stored in the M2M GW RAR entity 360 such as reachability, address, registration information, service information and/or the like, as well as device user-plane data that may be stored in the M2M GW RAR entity 360 or in another capability within the M2M GW 320. If an access is attempted to an M2M device that is not reachable, the M2M GW RAR entity 360 may direct that a cached response be issued rather than waiting for the M2M device to become reachable.

In another example, the M2M GW RAR entity 360 may perform data aggregation. The M2M GW RAR entity 360 may keep a list of M2M devices which form a group from which data may be aggregated. The M2M GW 320 may gather the information from such M2M devices and process it, (aggregate it) and send the aggregated results to the network. There may be several different groups defined, and an M2M device may belong to more than one group. The groups may also change over time. The M2M GW RAR entity 360 may keep track of all groups for M2M devices that belong to that M2M GW 320. This may apply both to the control-plane data stored in the M2M GW RAR entity 360 such as reachability, address, registration information, service information and/or the like, as well as device user-plane data.

In another example, the M2M GW RAR entity 360 may communicate with a parent M2M GW RAR, for example, when multiple hierarchical M2M GWs service a single network. The master GW RAR may act as a proxy to a slave GW's RAR or standalone M2M devices.

In another example, the M2M GW RAR entity 360 may perform device selection. Some M2M network applications may not know or not need to know device ID. Instead, an M2M network application, (such as a sensing application), may just submit a task which specifies the spatial area to be sensed and the time window for the sensing. Thus, there is no device ID, (or even group ID), in the application's request. For such applications, a capability in the N&A domain or M2M GW 320 may be required to determine the M2M devices to be involved in the application's request. Such a function/capability may be referred to as "device selection". If device selection is needed and is implemented in the M2M GW 320, this function may be integrated into the M2M GW RAR entity 360 or alternatively, as an additional function in the M2M GW 320, such as in the other functionality 368.

In another example, the M2M GW RAR 360 may perform device blacklisting. For example, certain M2M devices that fail the integrity verification procedure may be blocked from accessing the N&A domain. If this device integrity verification is handled in the N&A domain, (i.e., in the SC entity 359), the results of the integrity verification may be transferred to the M2M GW 320 and stored locally in the M2M GW RAR entity 360. The M2M GW 320 may query this information when using M2M services.

In another example, the M2M GW RAR entity 360 may be configured to act as an event manager and to report on monitored events. For instance, it may be configured to monitor when an M2M device registers with the M2M GW RAR entity 360, and to report this event back to some other entity. The event manager may be configured during M2M GW 320 registration, or autonomously by the N&A domain. The details of the configuration may be carried in the registration response message, or in a dedicated configuration message. The configuration information may include the events to be monitored or measured, and the parameters for triggering the response action. These parameters may include an absolute change in some measured or observed value, the persistence of the trigger conditions, (e.g., time-to-trigger), and hysteresis parameters that may prevent ping-pong like conditions. Once an event is triggered, the M2M GW RAR entity 360 may initiate a message transmission to the recipient, (e.g., the entity that issued the event monitor, or some other configured entity), or it may take some local action within the M2M GW 320, (e.g., block access to an M2M device).

In order to support the functionality described herein for the M2M GW RAR entity, additional functionality may be included in the N&A domain service capabilities. For example, if the M2M GW RAR entity 360 supports event manager functions, then the N&A domain may need to configure M2M GW RAR 360 for the event manager. In one embodiment, these functions may be included in the N&A RAR entity 350.

In another example, for cases where the M2M GW RAR entity 360 may use a form of "Registration Attribute" to filter out M2M device registration requests, the N&A RAR entity 350, (or possibly some other M2M core network capability), may send the registration attribute list to the M2M GW 320. This may be performed during registration of the M2M GW 320, for example, in the registration response message, or upon request from the M2M GW 320. Alternatively, the network may decide to autonomously change this registration attribute list and send this information to the M2M GW 320.

In another example, in cases where a network application or some other N&A service capability accesses an M2M device behind an M2M GW 320, the N&A domain RAR entity 350 may initiate a tunnel between itself and the proxy RAR entity in the M2M GW 320, (the M2M GW RAR entity 360). In such an example, the N&A domain RAR entity 350 may keep track of control plane information pertaining to the M2M GW 320, and not to the M2M devices behind it. The first time the network application attempts to access the M2M device, the N&A domain RAR entity 350 may query the M2M GW RAR entity 360 to determine the device reachability and next wake-up period, if the M2M device is reachable. At the same time, it may initiate the setup of a tunnel so that subsequent communications between the network application and M2M device may not need to rely on the N&A domain RAR 350 to determine device reachability. Rather, the N&A RAR entity 350 may keep track of M2M GW 320 reachability. When the M2M GW 320 is reachable, messages may be transparently routed to the M2M GW RAR entity 360, which may determine device reachability. If the M2M device is not reachable, the M2M GW 320 may store the message and forward the message at a later time.

Figure 4:
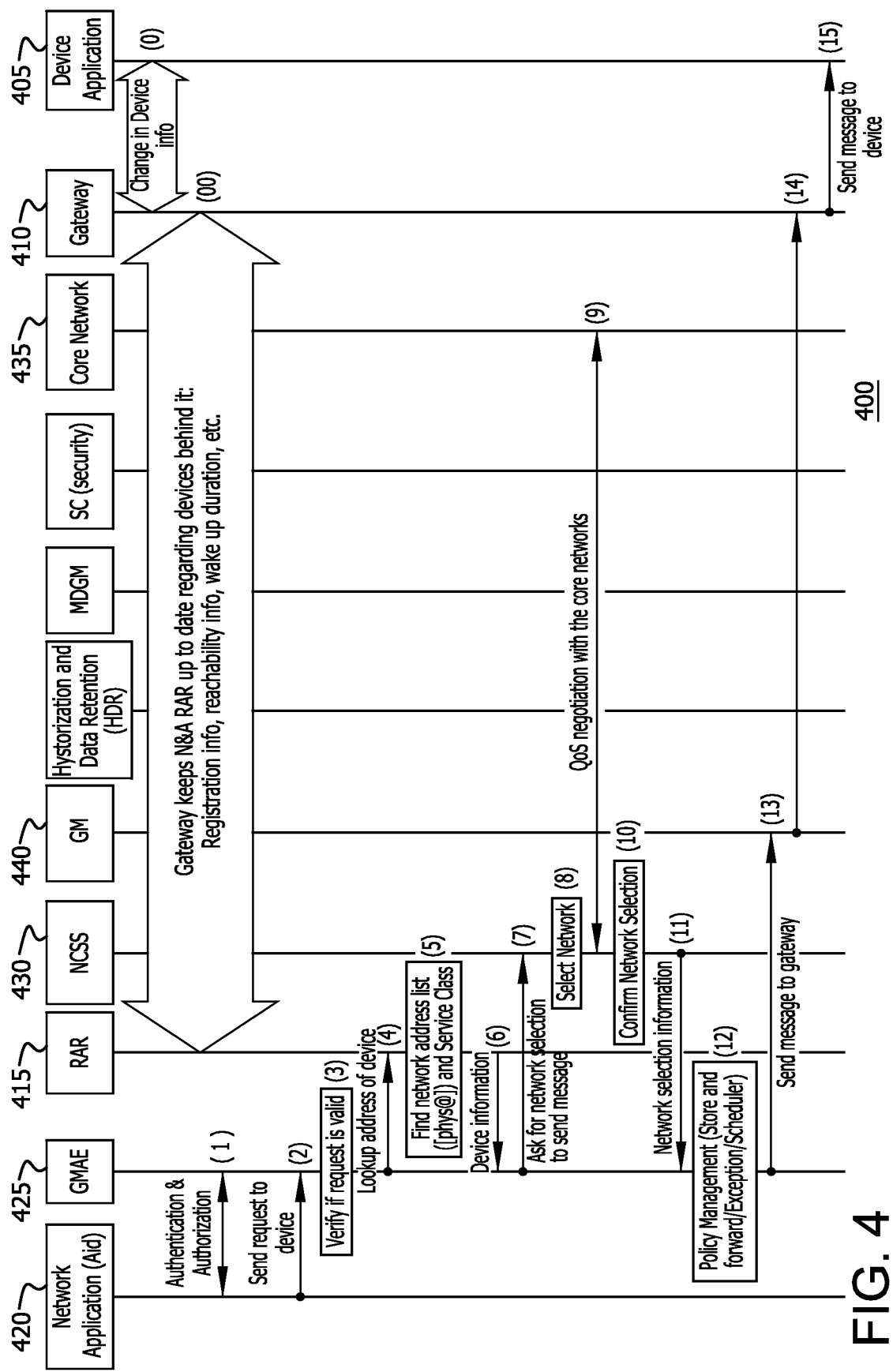
FIG. 4 is an example call flow of a network to device communication.
Figure 5:
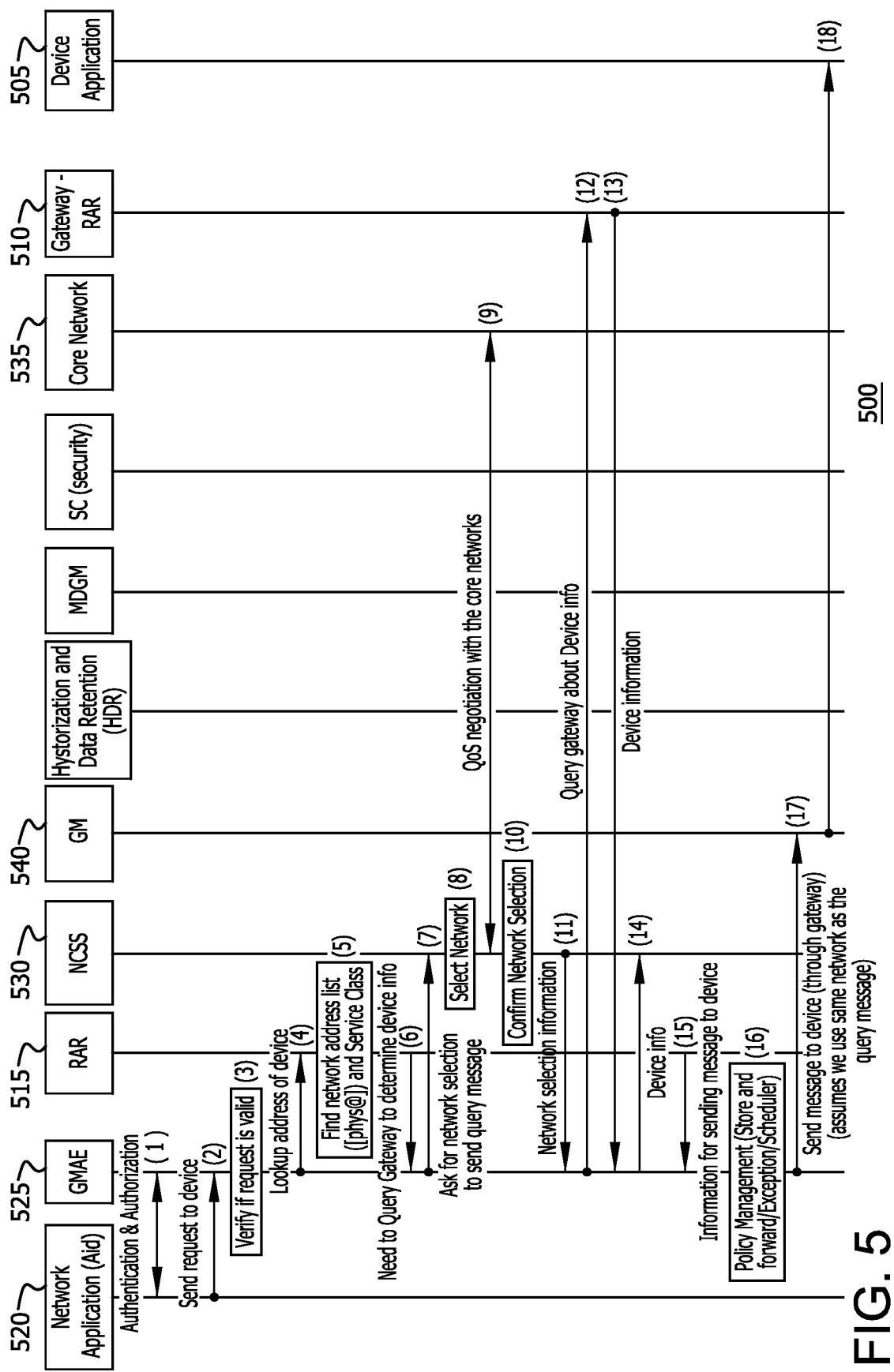
FIG. 5 is an example call flow of a network to device communication with a GW RAR.

FIGS. 4, 5, and 6 are example call flows that may be used for a network application to device application message transfer. In each of the three examples, the M2M device may lie behind an M2M GW.

The call flow 400 of FIG. 4 illustrates a baseline call flow where the M2M GW 410 lacks a RAR entity. In call flow 400, the device application 405 may communicate a change, such as registration information, reachability information and the like, to a GW 410 (0). The GW 410 may communicate this change to an N&A RAR entity 415 to keep it up to date with regard to M2M devices behind the GW 410 (00).

A message transfer request initiated by a network application 420 (2) undergoes an authentication and authorization process with a GMAE 425 (1). The GMAE 425 may then verify that the request from the network application 420 is valid (3). After verification, the GMAE 425 may query the N&A RAR entity 415 to lookup the address of the M2M device (4). The N&A RAR entity 415 may find the address and the service class (5) and then may send the device information to the GMAE 425 (6). The GMAE 425 may then request the NCSS 430 to determine the network for sending the message (7). The NCSS 430 may select a network (8), negotiate quality of service (QoS) with a core network 435 (9) and confirm the network selection (10). The network selection may then be sent by the NCSS 430 to the GMAE 425 (11), which then applies policy management procedures to determine if it should store and forward the message, apply an exception and/or schedule the message (12). The GMAE may then send the message to the GM 440 (13), which in turn forwards the message to the M2M GW 410 (14). The M2M GW 410 may then send the message to the device application 405 (15).

The call flow of FIG. 5 illustrates a call flow 500 where an M2M GW includes a RAR entity 510. A message transfer request initiated by a network application 520 (2) undergoes an authentication and authorization process with a GMAE 525 (1). The GMAE 525 may then verify that the request from the network application 520 is valid (3). After verification, the GMAE 525 may query the N&A RAR entity 515 to lookup the address of the M2M device (4). The N&A RAR entity 515 may not have the have the address information for the device, and may query the M2M GW RAR to find the address and the service class (5). To accomplish this, it may send the gateway information to the GMAE 525 (6). The GMAE 525 may then request the NCSS 530 to determine the network for sending the message (7). The NCSS 530 may select a network (8), negotiate quality of service (QoS) with a core network 535 (9) and confirm the network selection (10). The network selection may then be sent by the NCSS 530 to the GMAE 525 (11), which may then send a query about the device information to the M2M GW RAR 510 (12). The M2M GW RAR 510 may then send the device information to the GMAE 525 (13), which in turn may forward the device information to the N&A RAR 515 (14). The N&A RAR 515 may then send to the GMAE 525 information for sending the message to the device application 505 (15). The GMAE 525 may then apply policy management procedures to determine if it should store and forward the message, apply an exception and/or schedule the message (16). The GMAE may then send the message to the GM 540 (17), which in turn forwards the message to the device application 505 (18).

The call flow of FIG. 6 illustrates a call flow 500 where an M2M GW includes a RAR entity 510 and a tunnel is set up between an N&A RAR 615 and an M2M GW RAR 610. In call flow 600, a tunnel (00) may be established between N&A RAR 615 and M2M GW RAR 610 after the first application to device transmission (0).

A message transfer request initiated by a network application 620 (2) undergoes an authentication and authorization process with a GMAE 625 (1). The GMAE 625 may then verify that the request from the network application 620 is valid (3). After verification, the GMAE 625 may query the N&A RAR entity 615 to lookup the address of the M2M device (4). The N&A RAR entity 615 may not have the address information for the device (5). Instead, it may send the gateway information and the indication to use the tunnel to the GMAE 625 (6). The GMAE 625 may then request the NCSS 630 to determine the network for sending the message (7). The NCSS 630 may select a network (8), negotiate quality of service (QoS) with a core network 635 (9) and confirm the network selection (10). The network selection may then be sent by the NCSS 630 to the GMAE 625 (11), which may then apply policy management procedures to determine if it should store and forward the message, apply an exception and/or schedule the message (12). The GMAE may then send the message to the GM 440 (13) using the tunnel. The GM 640 may then forward the message to the M2M GW RAR 610 (14) using the tunnel. The M2M GW 610 may then send the message to the device application 605 (15).

Described herein are enhanced functionality and call flows for the MDGM. The MDGM capability in the M2M GW has been identified as an M2M GW management proxy. By performing as an M2M GW management proxy, the MDGM in the M2M GW may support at least the following two aspects of management functionality: (1) accept and process the management requests from the N&A domain on behalf of the M2M devices under its control, and (2) perform management functions of the M2M devices on behalf of the N&A domain.

When performing as an M2M GW management proxy, the MDGM capability in the M2M GW may receive the same management requests, (in one or consecutive messages), targeting multiple M2M devices under its control. Such requests may trigger a resource-consuming operation process, (e.g., bulk downloading of firmware and/or software data objects), that may lead to performance deterioration in the N&A domain and the M2M GW. In this case, the M2M GW may optimize the operation process by reducing the signaling and data traffic to and from the N&A domain.

The MDGM capability in the M2M GW may act as an M2M GW management client. The MDGM in the M2M GW may perform configuration management (CM), performance management (PM), fault management (FM) and software and firmware upgrade functions of the M2M GW.

The MDGM in the M2M GW may act as an M2M gateway management proxy. For example, the MDGM in the M2M GW may accept and process management requests from the N&A domain on behalf of one or more M2M devices. In another example, the MDGM in the M2M GW may request the N&A domain for permission to start interacting with one or more M2M devices to perform device management tasks, (e.g., bulk firmware and/or software update, fault and performance diagnostics), and perform such tasks after receiving such permission.

In another example, the MDGM in the M2M GW may initiate, as per the policy of the N&A domain provisioned on the M2M GW, interactions for device management tasks, (e.g., bulk firmware and/or software update, fault and performance diagnostics), with one or multiple M2M devices, and inform the N&A domain of the results of the device management interactions. This may be the case where the GW is a true, largely autonomous proxy for the network.

In another example, in the case of managing multiple M2M devices with the same operations, (e.g., bulk firmware and/or software update, fault and performance diagnostics), the M2M GW may optimize the operation process, (e.g., bulk downloading of firmware and/or software data objects, fault and performance diagnostics), to reduce the signaling and data traffic to and from the N&A domain.

The MDGM in the M2M GW may also act as an M2M GW management proxy to perform management functions of the M2M devices. For that purpose it may need to use scheduling functions when an M2M device is in sleep mode. Management proxy functions may include, but are not limited to, management protocol translation, protocol encapsulation and decapsulation, and the like.

In conventional call flows, the only functionality performed by MDGM is to provide the default configuration of N&A M2M applications or M2M device applications for their first registration. Call flows for the main functionalities, (e.g., configuration management, performance management, fault management, software and firmware upgrade, etc.), have not been provided.

The examples and embodiments disclosed herein provide a general view regarding the end-to-end device and gateway management procedures so as to validate the main functionalities of the MDGM at a system level and to complete the M2M functional architecture. The embodiments below address the case 2 or "Gateway as a Network Proxy" connectivity, where the M2M GW performs device management procedures on behalf of the M2M network and application domain. In particular, the example call flows are for M2M network or application-initiated device management (gateway as a network proxy).

Figure 7A:
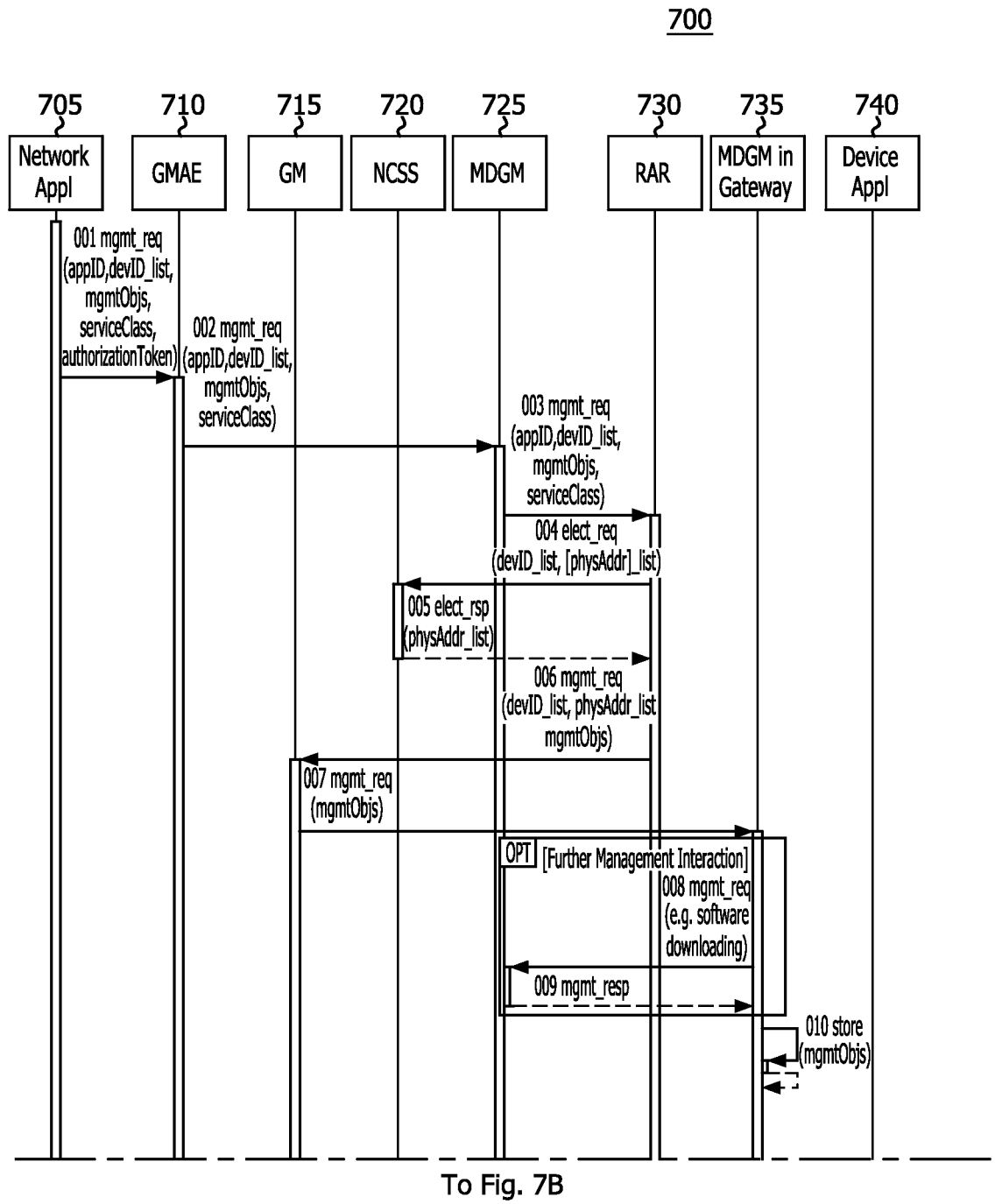
FIGS. 7A and 7B are an example call flow for M2M device management via a GW acting as a network proxy when a M2M device is online.
Figure 7B:
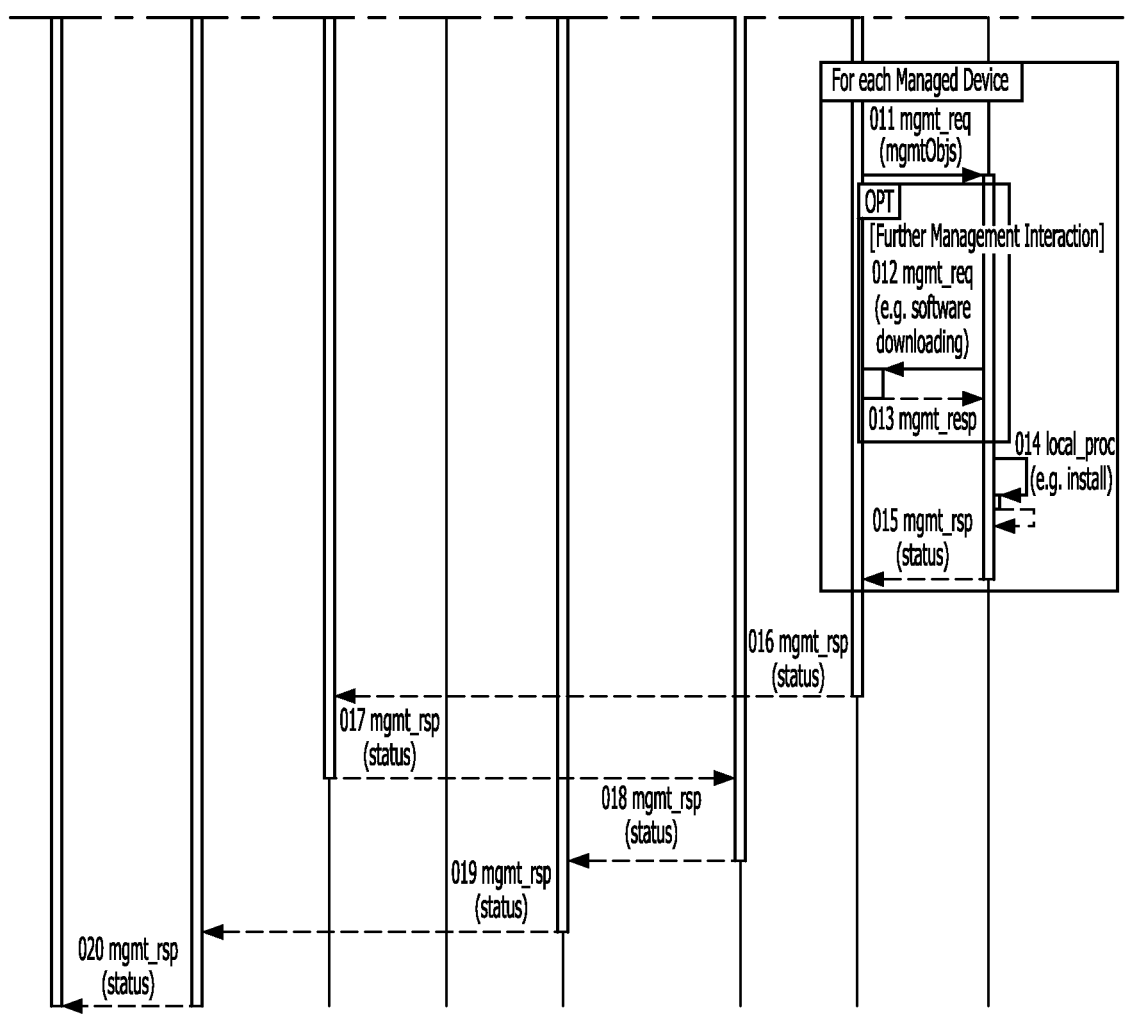
Figure 8A:
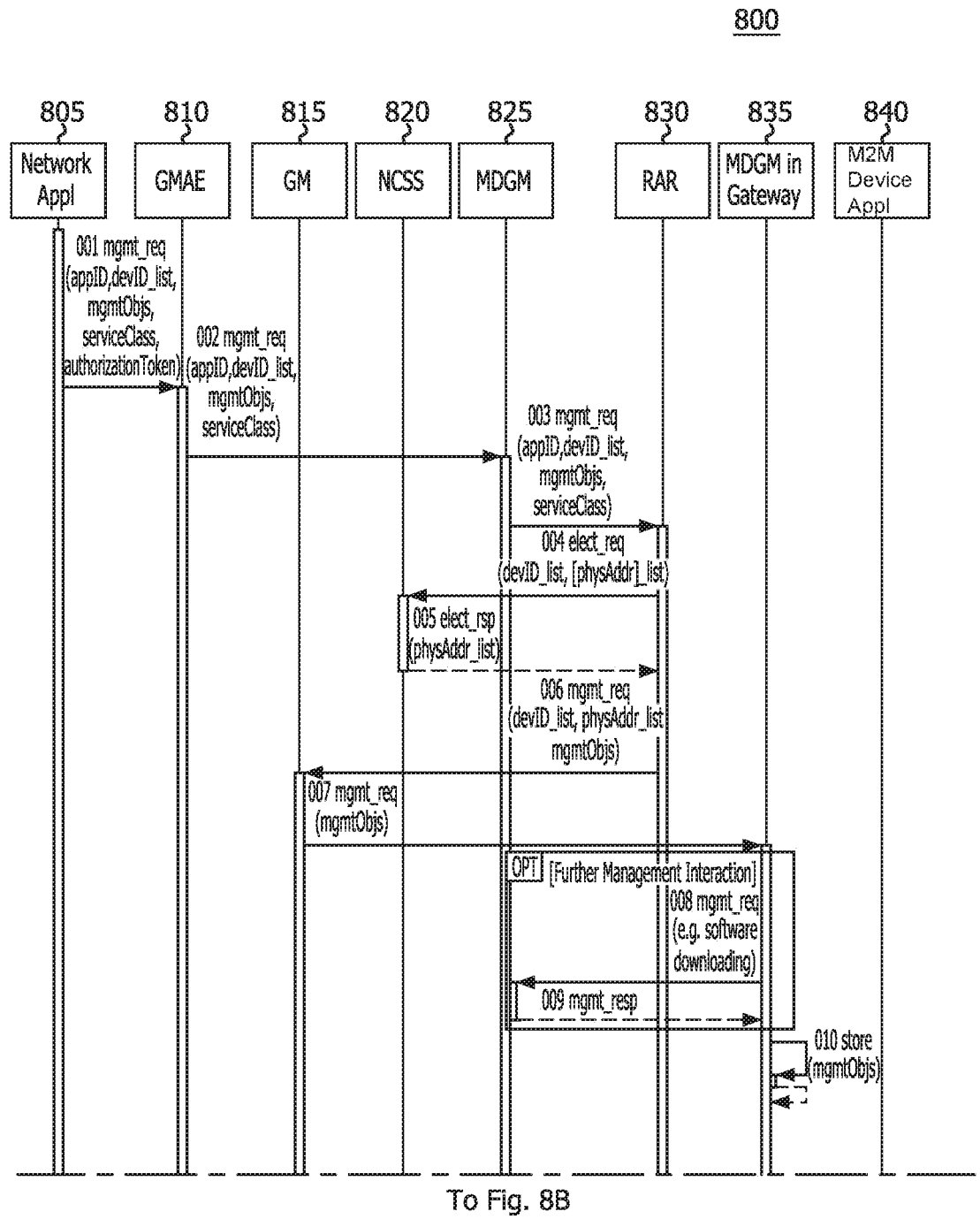
FIGS. 8A and 8B are an example call flow for M2M device management via a GW acting as a network proxy when an M2M device is offline.
Figure 8B:
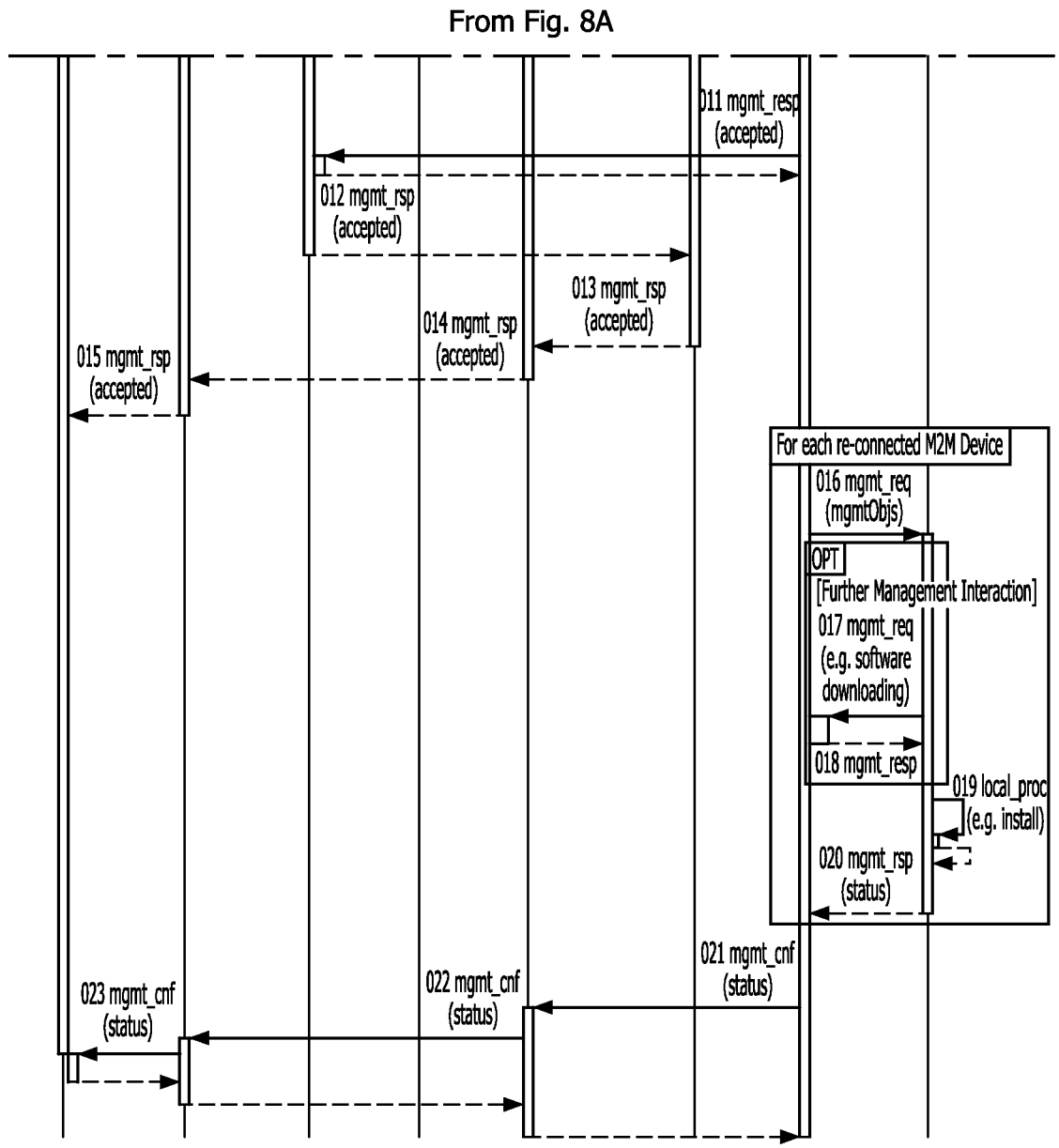

When an M2M network application issues device management requests to one or more M2M devices via an M2M GW, it may conform to the call flows shown in FIGS. 7A and 7B and 8A and 8B. FIGS. 7A and 7B are an example call flow if the M2M device is online (connected) and an immediate interaction is needed, and FIGS. 8A and 8B are an example call flow if the M2M device is offline or if an immediate interaction with the M2M device is not absolutely required.

In the call flows discussed herein, device management requests may be initiated from the M2M network application as a typical example. Generally, such requests may be initiated from any trusted entities residing in the M2M N&A domain, as long as they are authenticated and authorized by the GMAE. Alternatively, the MDGM may also initiate the management requests for the purpose of operator administration. In this case, the call flow may be a little different. In another example, the M2M GW MDGM entity may initiate the management request. The intended receivers of the management requests may be M2M device applications. Some management requests, (e.g., firmware update, reboot, connectivity configuration, and the like), may be targeted to the whole M2M device rather than one of its hosted device applications. In this case, a dedicated M2M device application may exist in the intended M2M device to respond to such management requests. For simplicity, some M2M service capabilities, (e.g., HDR, SC, TM, and the like), that may not be critical or necessary for the device management operation are not illustrated in FIGS. 7A and 7B and 8A and 8B.

As stated above, FIGS. 7A and 7B shows an example call flow 700 for M2M device management via an M2M GW (M2M GW as a network proxy) when the M2M device is online. In particular, the call flow may occur when an M2M network application 705 initiates a device management procedure with one or more online M2M devices 740 via an M2M GW 735.

The M2M network application 705 may contact the GMAE 710 to issue a management request to one or more M2M devices 740 connecting to the network via the same M2M GW 735 (001). The management request may include parameters such as appID, devID_list, mgmtObjs, serviceClass, authorizationToken, and the like. The mgmtObjs parameter may be used to encapsulate the detailed management commands, parameters and data objects for the purpose of device management. The devID_list parameter may contain a list of identifiers referring to the intended device applications located on one or more M2M devices managed by the same M2M GW.

After authentication and authorization is completed, to ensure that the M2M network application 705 is authentic and authorized to issue the request, the GMAE 710 may contact the N&A MDGM 725 to execute the management request (002). According to the detailed information provided in mgmtObjs, the N&A MDGM 725 may decide to contact the RAR 730 to deliver the management request to the intended M2M device applications 740 (003). The content of mgmtObjs delivered to the M2M device applications 740 may be modified from the original mgmtObjs received from the M2M network application 705 at the discretion of the N&A MDGM 725.

The RAR 730 may contact the NCSS 720 to determine which physical interface it may use to access the M2M devices 740 (004). The NCSS 720 may determine the interface based on, for example but not limited to, device reachability information and/or some policy management, and return the device physical address corresponding to this interface for each intended M2M device application 740 (005). The RAR 730 may forward the management request to the GM delivery capability 715 (006), which in turn may deliver the management request to the M2M GW 735 that manages the intended M2M devices (007). The network for sending the management request may be selected based on QoS requirements that may originate from the NCSS 720 entity and forwarded to the GM 715, as well as any other policies that are relevant to the service class which may originate from any other service capability and forwarded to the GM 715. The management request may be sent as several messages each targeting an intended M2M device application or as an aggregated message for all of the intended M2M device applications.

Optionally, according to the received management request, the MDGM in the M2M GW 735 may need to contact the N&A MDGM 725 for further management operations, (e.g., downloading software and/or firmware packages, configuring parameters, or reporting statistic data, and the like) (008). The N&A MDGM 725 may send the requested management information to the MDGM in the M2M GW 735 (009). If the management operations for different M2M device applications are the same, such operations may be optimized by, for example, aggregating to reduce the communication overhead between the M2M GW 735 and the M2M N&A domain. A broadcast update may be warranted under the discretion of the M2M GW 735, (based off of reachability, and the like). The MDGM in the M2M GW 735 may store the management request and any management objects received from the N&A MDGM 725 (010). Alternatively, the M2M GW 735 may store all device configurations, perform all MDGM actions directly with the M2M device 740, and aggregate all responses prior to sending a successful update message to the initiator or a list of which device updates were unsuccessful.

The MDGM in the M2M GW 735 may initiate a new management request to each intended M2M device application 740 according to the original request from the M2M network application 705 (011). The new management request may conform to the original one in the sense of the management operation result, while it may be different in terms of the request initiator or the management data source for the sake of optimization. Optionally, according to the received management request, each M2M device application 740 may need to contact the MDGM in the M2M GW 735 for further management operations, (e.g., downloading software and/or firmware packages, configuring parameters, or reporting statistic data, etc.) (012 and 013).

Each M2M device application 740 may run a local process to deploy the management objects as requested by the M2M network application 705 (014), and return the status of the management operation to the MDGM in the M2M GW 735 (015). Alternatively, the M2M device application 740 may store the current configuration as part of running a process to deploy the management objects. If the download or update was unsuccessful, the M2M device application 740 may invalidate and remove the unsuccessful update and signal this fact back to the N&A MDGM 725, (for example in 016 and 017). Alternatively, the MDGM in the GW 735 may store the configuration information for all M2M devices.

The MDGM in the M2M GW 735 may return the status of the management operation to the GM 715 (016), which in turn passes it to the RAR 730 (017). The MDGM in the M2M GW 735 may aggregate the status of the managed M2M device applications 740 in a limited time span before returning the status to the GM 715 to optimize the communication overhead. The status of the management operation result may be returned to the N&A MDGM 725 (018), and later M2M network application 705 (020) through the GMAE 710 (019).

As stated above, FIGS. 8A and 8B shows an example call flow 800 for M2M device management via an M2M GW (M2M GW as a network proxy) when the M2M device is offline. In particular, the call flow may occur when an M2M network application 805 initiates a device management procedure with one or more offline (hibernating) M2M devices and/or M2M device applications 840 via an MDGM in an M2M GW 835.

The M2M network application 805 may contact the GMAE 810 to issue a management request to one or more M2M devices and/or device applications 840 (hereinafter referred to as "M2M device applications 840") managed by the same MDGM in the M2M GW 835 (001). The management request may include parameters such as appID, devID_list, mgmtObjs, serviceClass, authorizationToken, and the like. The mgmtObjs parameter may be used to encapsulate the detailed management commands, parameters and data objects for the purpose of device management. The devID_list parameter may contain a list of identifiers referring to the intended device applications located on one or more M2M devices managed by the same M2M GW.

After authentication and authorization is completed to ensure that the M2M network application 805 is authentic and authorized to issue the request, the GMAE 810 may contact the N&A MDGM 825 to execute the management request (002). According to the detailed information provided in mgmtObjs, the MDGM 825 may decide to contact the RAR 830 to deliver the management request to the intended M2M device applications 840 (003). The content of mgmtObjs delivered to the M2M device applications 840 may be modified from the original mgmtObjs received from the M2M network application 805 at the discretion of the N&A MDGM 825.

Although the intended M2M device applications 840 are temporally unreachable, their managing MDGM in the M2M GW 835 is currently registered and available to the RAR 830. Therefore, the RAR 830 may contact the NCSS 820 to determine which physical interface it may use to access the MDGM in the M2M GW 835 (004). The NCSS 820 may determine the interface based on, for example but not limited to, device reachability information and/or some policy management, and return the device physical address corresponding to this interface (005). The RAR 830 may forward the management request to the GM capability 815 (006), which in turn may deliver the management request to the MDGM in the M2M GW 835 that manages the intended M2M devices (007). The network for sending the management request may be selected based on QoS that may originate from the NCSS entity 820 and then forwarded to the GM entity 815, as well as any other policies that are relevant to the service class that are from any other service capability entity.

Optionally, according to the received management request, the MDGM in the M2M GW 835 may need to contact the N&A MDGM 825 for further management operations, (e.g., downloading software and/or firmware packages, configuring parameters, or reporting statistic data) (008). The N&A MDGM 825 may send the requested management information to the MDGM in the M2M GW 835 (009). If the management operations for different M2M device applications 840 are the same, such interactions may be optimized by, for example, aggregating to reduce the communication overhead between the MDGM in the M2M GW 835 and the N&A M2M domain. The MDGM in the M2M GW 835 may store the management request and any management objects received from the N&A MDGM 825 (010).

The MDGM in the M2M GW 835 may respond to the N&A MDGM 825 via the GM 815 (011) and the N&A RAR 825 (012) that the management request has been accepted on behalf of the M2M device application 840 but will be delivered later since the intended M2M device application 840 is temporarily unreachable (013). The management response may be returned to the M2M network application 805 (015) through the GMAE 810 (014).

When each of the intended M2M device applications 840 connects back to the network, the following call flow may take place. The MDGM in the M2M GW 835 may initiate a new management request to the M2M device application 840 according to the original request from the M2M network application 805 (016). The new management request may conform to the original one in the sense of the management operation result, while it may be different in terms of the request initiator or the management data source for the sake of optimization. Optionally, according to the received management request, the M2M device application 840 may need to contact the MDGM in the M2M GW 835 for further management operations, (e.g., downloading software and/or firmware packages, configuring parameters, or reporting statistic data, and the like) (017 and 018).

The M2M device application 840 may run a local process to deploy the management objects as requested by the M2M network application 805 (019), and return the status of the management operation to the MDGM in the M2M GW 835 (020). The M2M device application 840 may store the current configuration as part of running a local process that deploys the management objects, in order to be able to invalidate and remove any download or update that was unsuccessful. If such removal occurs, such fact may be signaled back to the MDGM in the M2M GW 835, and then forwarded to the N&A MDGM 825 (for example as part of 021-023). Alternatively, the MDGM in the M2M GW 835 may store the configuration information for all M2M devices.

The MDGM in the M2M GW 835 may return the status of the management operation to the N&A MDGM 825 by a final management confirmation (021). For managing more than one M2M device application, the MDGM in the M2M GW 835 may aggregate the status in a limited time span to optimize the communication overhead. The final management confirmation may then be forwarded to the M2M network application 805 (023) through the GMAE 810 (022).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A machine to machine (M2M) gateway (GW), comprising:
    at least one processor configured to receive registration attributes for a registration service, for a plurality of M2M devices, wherein the registration attributes comprise an M2M device identification for each of the plurality of M2M devices;
    the at least one processor further configured to receive a registration request from one of the plurality of M2M devices to register with the M2M GW;
    the at least one processor further configured to determine, using the registration service, that the requesting M2M device is permitted to register based on a comparison of the registration request to the M2M device identification of the requesting M2M device;
    the at least one processor further configured to register the requesting M2M device with the M2M GW; and
    the at least one processor further configured to communicate with the requesting M2M device to provide the requesting M2M device with an M2M common service capability.

2. The M2M GW of claim 1, wherein the at least one processor is further configured to receive the registration attributes from a network and application service.

3. The M2M GW of claim 1, further comprising a memory configured to store the registration attributes.

4. The M2M GW of claim 1, wherein the registration attributes further comprise at least one of a service class, power availability for each of the plurality of M2M devices, and memory availability for each of the plurality of M2M devices.

5. The M2M GW of claim 1, wherein the at least one processor is further configured to authenticate the plurality of M2M devices to use the M2M common service capability.

6. The M2M GW of claim 1, wherein the at least one processor is further configured to save the registration attributes in a mapping table that comprises an M2M area network address for each of the plurality of M2M devices.

7. The M2M GW of claim 1, wherein the at least one processor is further configured to determine whether there is a change in registration information of the requesting M2M device based on the registration attributes.

8. The M2M GW of claim 7, wherein the at least one processor is further configured to send a notification message to a network and application service on a condition that there is a change in the registration information of the requesting M2M device.

9. A method implemented by a machine to machine (M2M) gateway (GW), the method comprising:
    receiving registration attributes for a registration service, for a plurality of M2M devices, wherein the registration attributes comprise an M2M device identification for each of the plurality of M2M devices;
    receiving a registration request from one of the plurality of M2M devices to register with the M2M GW;
    determining, using the registration service, that the requesting M2M device is permitted to register based on a comparison of the registration request to the M2M device identification of the requesting M2M device;
    registering the requesting M2M device with the M2M GW; and
    communicating with the requesting M2M device to provide the requesting M2M device with an M2M common service capability.

10. The method of claim 9, further comprising receiving the registration attributes from a network and application service.

11. The method of claim 9, wherein the registration attributes further comprise at least one of a service class, power availability for each of the plurality of M2M devices, and memory availability for each of the plurality of M2M devices.

12. The method of claim 9, further comprising authenticating the plurality of M2M devices to use the M2M common service capability.

13. The method of claim 9, further comprising saving the registration attributes in a mapping table that comprises an M2M area network address for each of the plurality of M2M devices.

14. The method of claim 9, further comprising determining whether there is a change in registration information of the requesting M2M device based on the registration attributes.

15. The method of claim 14, further comprising sending a notification message to a network and application service on a condition that there is a change in the registration information of the requesting M2M device.

* * * * *